June 23, 1953  J. T. KING  2,643,131
POWER TRANSMISSION
Filed Nov. 14, 1947  4 Sheets-Sheet 3
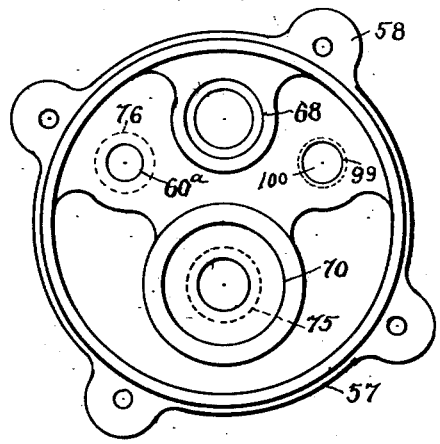
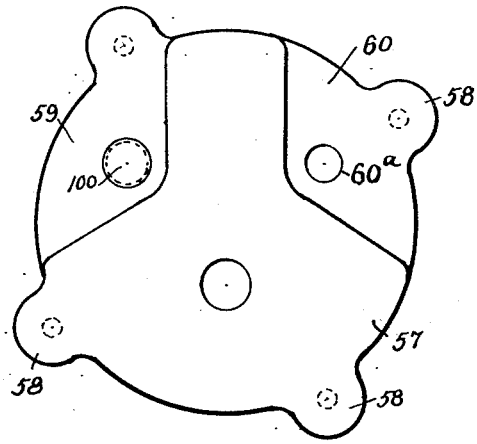
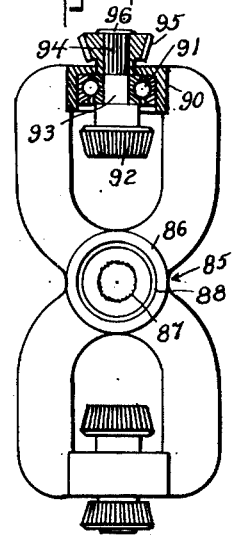
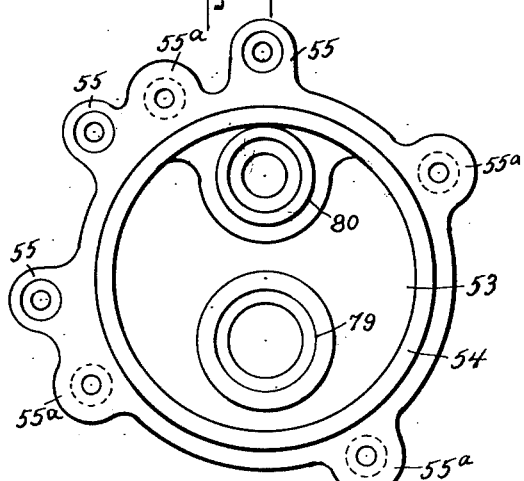
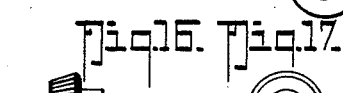
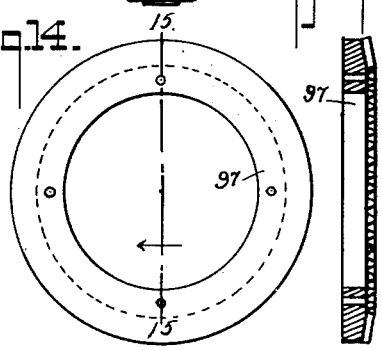
Inventor,
James T. King,
By Albert E. Dieterich,
Attorney

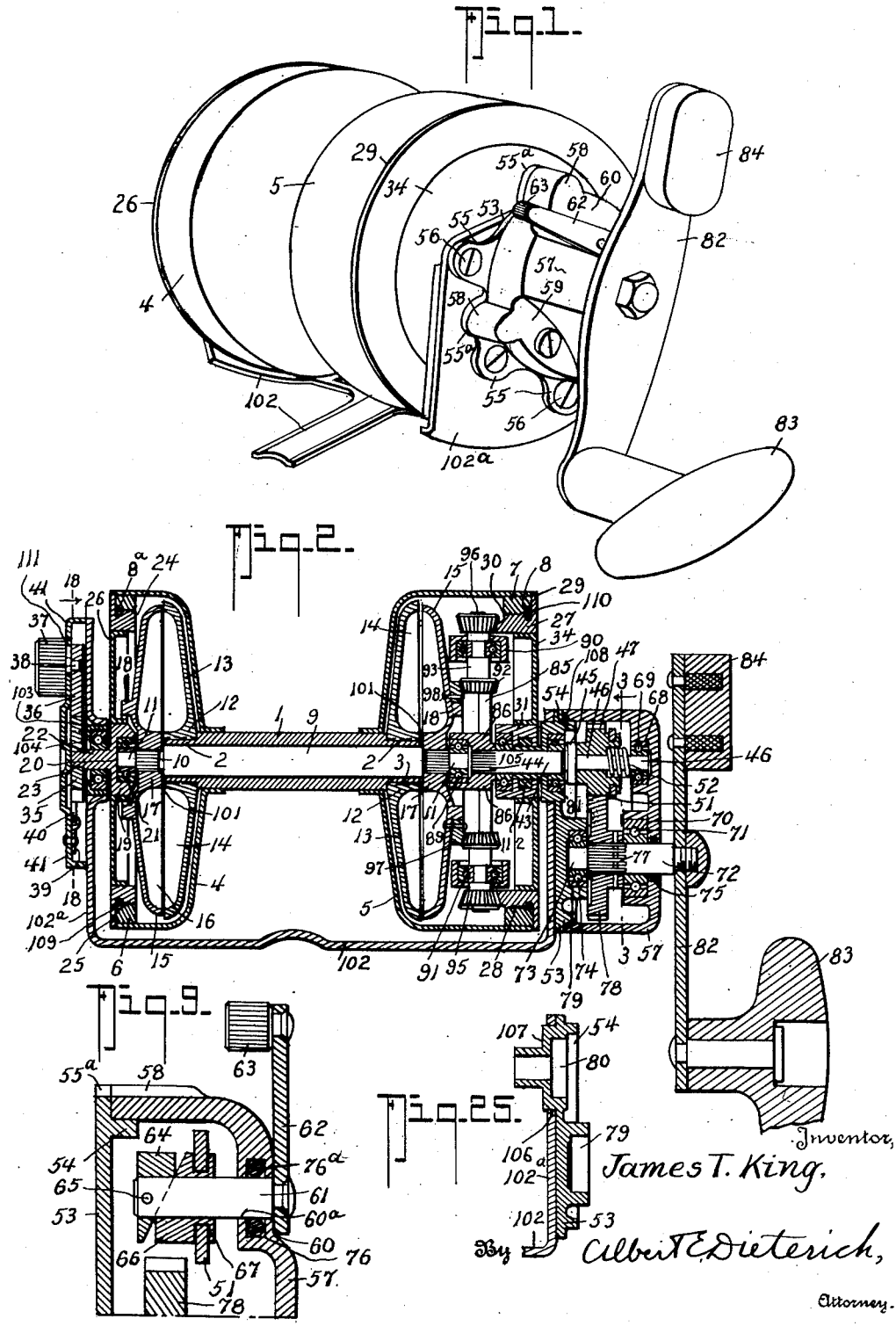

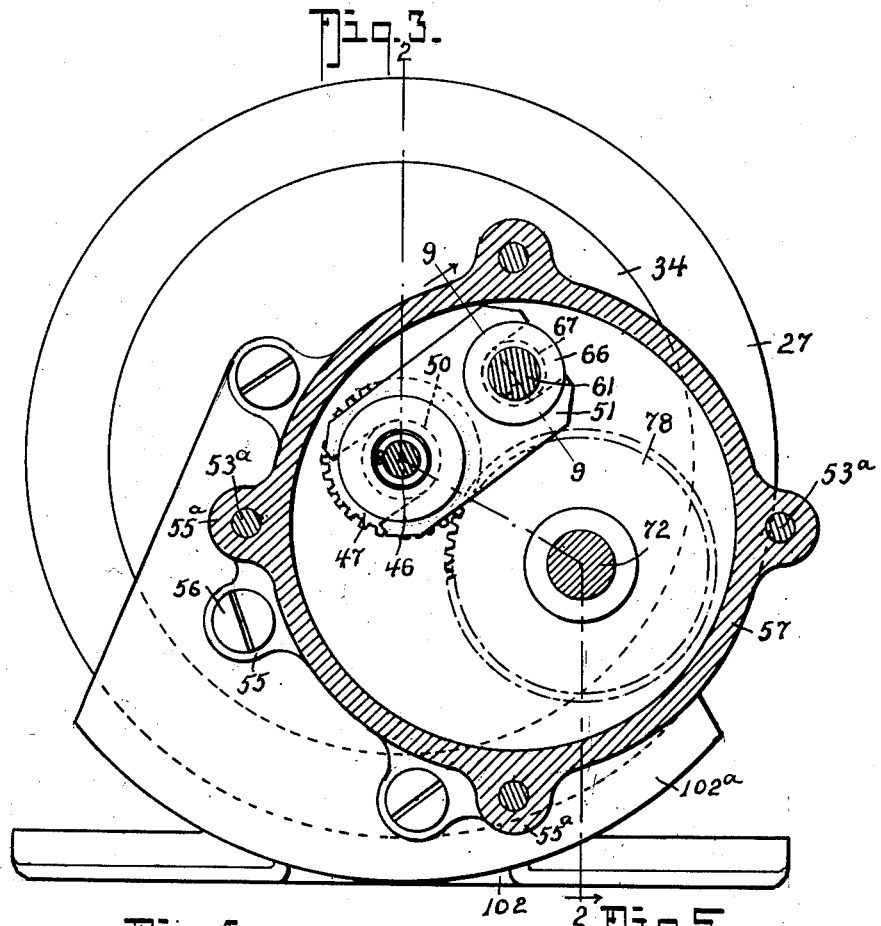

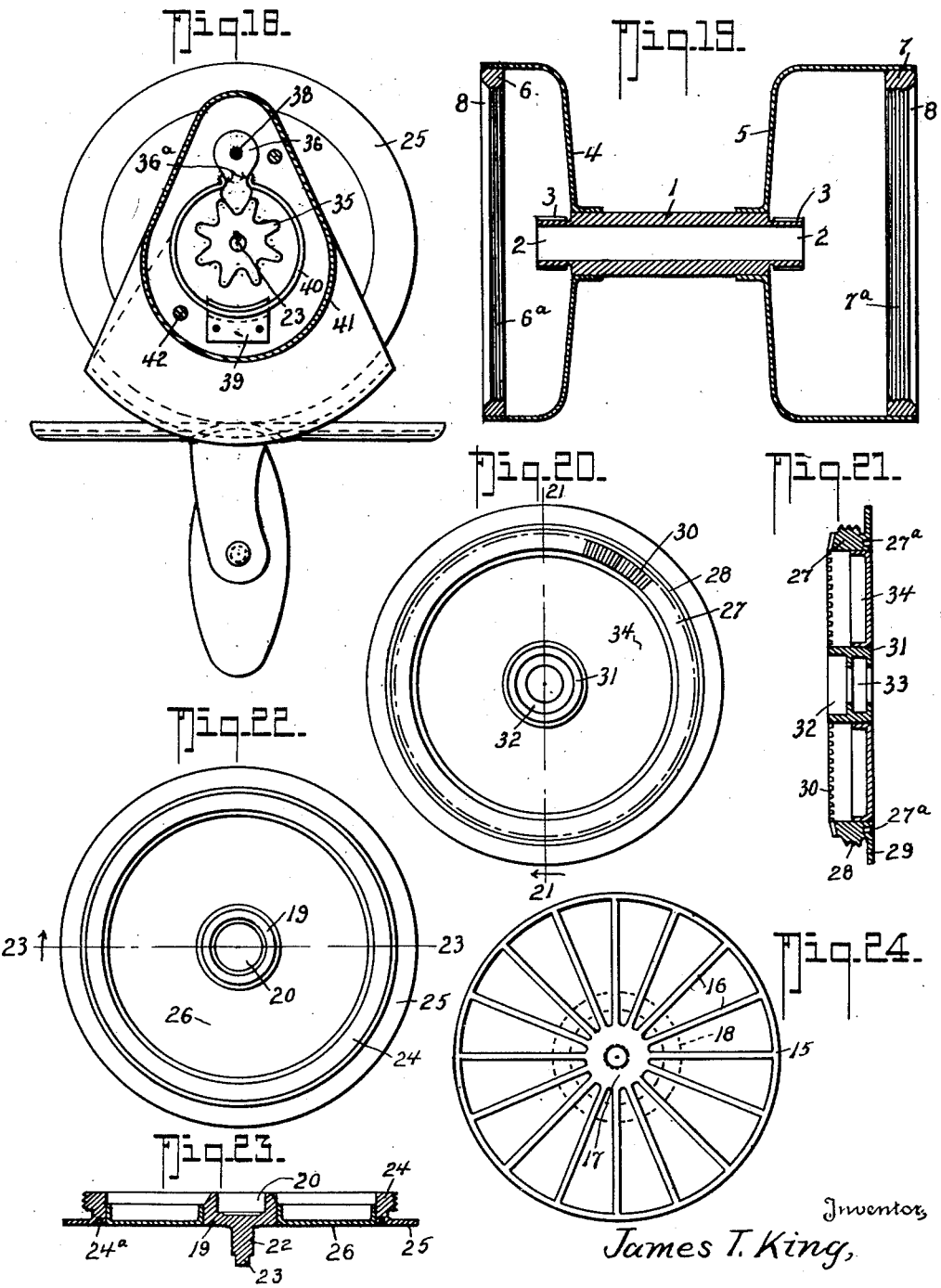

Patented June 23, 1953

2,643,131

UNITED STATES PATENT OFFICE 2,643,131

POWER TRANSMISSION

James T. King, Burbank, Calif.

Application November 14, 1947, Serial No. 786,041

9 Claims. (Cl. 242—84.7)

My invention is a power transmission mechanism which, while of wider use, has been especially designed for operating reels, such, for example, as the fishing reels disclosed in my Patents No. 2,388,979, issued November 13, 1945, No. 2,389,515, issued November 20, 1945, No. 2,462,974, issued March 1, 1949, and No. 2,462,975, issued March 1, 1949.

The present invention has for its objects:

1. To simplify the constructional and operational features of the device.

2. To provide means to make the fluid drive clutch act with greater efficiency than is possible with the structures disclosed in the above mentioned patents and applications.

3. To provide the reel with a free running clutch which, when fully disengaged, permits the fluid drive clutch, spiders and all to rotate as a balanced unit with the reel spool.

4. To provide means to assist in preventing the back-lash troubles prevalent in the conventional geared fishing reel.

Other objects will in part be obvious and in part be pointed out hereinafter.

To the attainment of the aforesaid objects and ends invention still further resides in the novel details of construction, combination and arrangement of parts, all of which will be first fully described in the following detailed description, and then be particularly pointed out in the appended claims, reference being had to the accompanying drawing, in which:

Fig. 1 is a perspective view of a fishing reel embodying my invention.

Fig. 2 is a vertical longitudinal section of the same approximately on the line 2—2 of Fig. 3.

Fig. 3 is a section on the line 3—3 of Fig. 2, on a larger scale than Fig. 2.

Fig. 4 is a detail side elevation of the shaft-clutch member.

Fig. 5 is an end elevation of the same.

Fig. 6 is an end elevation of the shiftable clutch element that cooperates with the shaft-clutch element shown in Figs. 4 and 5, looking from left to right in Fig. 7.

Fig. 7 is a section on the line 7—7 of Fig. 6.

Fig. 8 is an end elevation of the same looking from right to left in Fig. 7.

Fig. 9 is a detail section on the line 9—9 of Fig. 3.

Fig. 10 is an elevation of the gear case looking at it from the open side.

Fig. 11 is a front elevation of the same.

Fig. 12 is a front elevation of the gear case plate.

Fig. 13 is a front elevation of the spider, and its gears, parts being in section.

Fig. 14 is a face view of smaller ring gear.

Fig. 15 is a section on the line 15—15 of Fig. 14.

Fig. 16 is a side elevation of one of the inner pinion shafts.

Fig. 17 is an end elevation of the same.

Fig. 18 is a section on the line 18—18 of Fig. 2.

Fig. 19 is a central vertical longitudinal section of the spool assembly.

Fig. 20 is an elevation of the externally threaded larger ring gear assembly looking from left to right in Fig. 21.

Fig. 21 is a section on the line 21—21 of Fig. 20.

Fig. 22 is an elevation of the other externally threaded ring assembly, looking down on Fig. 23.

Fig. 23 is a section on the line 23—23 of Fig. 22.

Fig. 24 is an elevation of one of the driving impellers.

Fig. 25 is a detail section of a portion of the cradle.

In the drawings in which like numerals and letters of reference indicate like parts in all the figures, I represents the hub of the spool unit or body to which the shells 4 and 5 are permanently united in any suitable way.

The hub 1 has reduced ends 2 that are externally serrated as at 3. In the open or outer end of the shell 4 is permanently mounted a ring 6 which is internally threaded as at 6a while a similar ring 7, internally threaded as at 7a, is permanently mounted in the open or outer end of the shell 5. Both rings 6 and 7 have bevelled edges 8 for a purpose presently to appear, see Fig. 19.

Located within the tubular hub 1 is the impeller shaft 9 on whose serrated end portions 10 the hubs 17 of the driving impellers 15 are respectively mounted to turn with the shaft 9 as a unit. The shaft 9 has end journals or bearing ends 11 to receive ball bearings 21 and 89 respectively, later again referred to.

Driven turbines 13 have their hubs 12 mounted on the serrated portions 3 of the hub ends 2 and respectively cooperate with the driving impellers 15. The turbines 13 have radial vanes 14 and the impellers 15 have vanes 16 as indicated in Fig. 2. The impellers 15 have annular flanges 18.

By referring now to Fig. 2 it will be seen that the outer end of the shell 4 is closed by an externally threaded ring 24 that screws into the ring 6 and comprises a part of the assembly shown in Figs. 22 and 23. The assembly shown in Figs. 22 and 23 includes the hub 19 which has a socket 20 to receive the ball bearing 21. The hub also has a stub shaft 22 and a reduced end 23 later again referred to. The hub 19 is permanently secured to the center of a flange plate 26, which plate is permanently secured to the ring 24. The ring 24 has a flange 25 to lie against the ring 6 and end of the shell 4, a sealing gasket 109 being provided as shown in Fig. 2. The ring also has recesses 24ª to receive a suitable tool to enable it to be screwed in tight.

27 indicates a ring having external threads 28 for screwing into the outer end of the shell 5 and having a flange 29 to abut the ring 7 and shell end, a suitable gasket 110 serving to form an effective seal (see Fig. 1).

As more clearly shown in Figs. 20 and 21 the ring 27 constitutes an element of an assembly which includes a hub 31 having a bearing receiving recess 32 and a packing groove 33. The hub 31 is permanently secured in the center of a flanged plate 34 which in turn is permanently secured in the ring 27. The parts 27, 31 and 34 comprise a unitary structure. The ring 27 is also provided with gear teeth 30 and thus functions as a bevel gear. Spanner receiving recesses 27ª are provided to enable the unit to be screwed into ring 7 tightly.

Referring now more particularly to Figs. 2 and 18 it will be seen that a ratchet wheel 35 is keyed to the shaft end 23 and cooperates with a pawl 36 that is carried on the stud 38 of a button 37. The stud passes through a slot 111 in the ratchet cover 41, so that the pawl may be lifted clear of the ratchet when desired.

A spring 40 is held to the cover 41 by a holder 39 and has its ends held to engage, respectively, the sides of the pawl 36 within the indented portions 36ª of the pawl, the arrangement being such, as shown in Fig. 18, that the spring will hold the pawl normally centered, but will allow it to turn to either side according to the direction in which the ratchet wheel 35 is turned. The spring will also hold the pawl in either its ratchet-engaging position or its released position when desired. The cover 41 is secured to the side 102ª of the cradle 102 by screws 42. The side 102ª carries a bearing retainer 103 (Fig. 2) in which the ball bearing 104 for the stub shaft 22 is located.

43 is a shaft-clutch having one end 44 serrated and provided with a radially slotted clutch disc 45 and a reduced shaft portion 46, the disc 45 being located intermediate the ends of the shaft 43, 46 as best shown in Fig. 4.

Shiftably mounted on the reduced portion 46 is a clutch-gear 47 having clutch elements 48 to engage the clutch elements 45. The clutch-gear 47 meshes with a driving gear 78 on a drive shaft 72 later again mentioned. The clutch-gear 47 also has a spring receiving socket 49 and a groove 50 for a clutch shifting fork 51. A spring 52, on shaft portion 46, projects into the socket 49 and abuts a ball bearing unit 69 that is held in a recess 68 in a gear case 57. The gear case 57 has lugs 58 for attachment to the ears 55ª of a plate 53 by screws 53ª (Fig. 3). The plate 53 has ears 55 and is fastened to a side 102ᵇ of the cradle 102 by screws 56, see Figs. 1 and 25. The plate 53 has a flange 54 over which the gear case fits. The front of the cover 57 has two recessed portions 59 and 60, one of which 59 has a filling aperture 99 normally closed by a screw plug 100.

The other recessed portion 60 has a shaft opening 60ª for the shaft 61 of a clutch lever 62. The lever 62 has a knob 63 through which the lever may be operated. Pinned at 65 to the shaft 61 is a clutch cam 64 that contacts cam member 66 having a groove 67 for the clutch shifter fork 51 (Figs. 3 and 9). A suitable packing 76ª is placed in the groove 76 to prevent escape of lubricant from the gear case 53, 57.

The case 57 has a groove 75 for shaft packing.

The gear case 57 has a recess 70 in which is a ball bearing unit 71 while the plate 53 has a recess 79 for a ball bearing unit 74 in which unit the end 73 of the crank shaft 72 fits. The crank shaft has a splined portion 77 on which the driving gear 78 fits. A crank 82 is fastened to the outer end of the shaft 72 and has a knob 83 and a counterweight 84 attached to it.

The driven shaft 46 is mounted in ball bearings 81 (located in recess 80) and 69 (located in recess 68).

As best shown in Figs. 2 and 13, it will be seen that a spider or yoke 85 has a hub 86 secured to the shaft 43. The hub has a recess 88 for the ball bearing unit 89 and a serrated portion 87 (Fig. 13) to fit the serrated portion 44 so that the spider will turn with the shaft 43. At each end the spider 85 has bearing holders 90 for ball bearing units 91 which carry pinion shafts 93 having integral pinions 92 and serrated ends 94 on which other pinions 95 are forced and secured by upsetting the ends of the shafts 93 as at 96. The arrangement is such that the pinions 95 mesh with the gear teeth 30 of the ring 27, while pinions 92 mesh with a small bevel or ring gear 97 secured to the outer face of driving impeller 15 by rivets 98, Figure 2.

101 designates shims placed between the hubs of the adjacent impellers to space them slightly apart.

105 is a ball bearing unit held in the recess 32 of the hub 31 and on the hub 86.

The side 102ª of the cradle has an opening 106 through which the tubular projection 107 of the plate 53 projects. The projection 107 also projects into the hub 31 and a packing 112 in groove 33 (Fig. 2). A gasket 108 seals the gear case 57 to plate 53.

In a practical embodiment of my invention in a fishing reel, the gear train consists of the spur gear 78 on the crank shaft 72 which drives the smaller spur gear 47 at a 1.83 to 1 increase and this smaller gear, through the shaft 43, drives the spider 85 on which the two sets of bevel gears 95, 92 are carried. The result of this arrangement is that for every revolution of the crank shaft the spider turns 1.83 revolutions. (This is less than the average standard increase for most fishing reels.)

Keeping in mind that the spider is always directly connected to the handle and turning at a positive speed as the operator desires, we now come to the basic improvement, which will be referred to as the multiplying differential. The differential consists of two like sets of pinions mounted on the spider. Each set consists of two bevel pinions keyed to a common shaft rotating in a ball bearing. One pinion rotates about the spider centerline on a 1.25 radius, the other on a .75 radius. Each pinion meshes with a bevel gear of 1.25 and .75 respectively. The multiplying differential then consists of the bevel pinions each meshing with its separate bevel gear.

Now it can be seen that if the spider is rotated by the crank the pinions must rotate with the spider and likewise the bevel gears will rotate with the spider so long as load on the bevel gears is proportionate to their respective diameters. However if you hold the large bevel gear still the spider will continue to turn and the small bevel gear will turn due to gear teeth ratios 4 times as fast as the spider and in the same direction.

Now if we connect the large bevel gear to the spool of the reel and the runner of a fluid drive clutch and the small bevel gear to the impeller of the fluid drive, it can be readily seen that when the spool is held still and the spider is being turned the impeller must turn 4 revolutions. This high speed then will make the fluid drive clutch act with greater force than possible by direct connection as in the past. Likewise it can be seen that the force or torque now developed in the fluid drive clutch is multiplied by 4 and transmitted back to the spool through the bevel gear train. In other word only ¼ of the total work required to turn the spool is done by the fluid drive coupling, yet we have in no way lost any of the advantages of the coupling; we have enhanced them and strengthened the fluid drive clutch's weak points.

In addition to the improved gearing mechanism, the reel now has a free running clutch and control, which when fully disengaged allows the fluid drive clutch, spiders and all to rotate as a balanced unit with the spool. The static and kinetically well balanced unit and spool free running characteristic of the improved fishing reel, also assists in the prevention of back lash troubles prevalent in the conventional geared fishing reel.

With the single exception for the selective free spool control, all operational control is centered and obtained through the turning of the reel handle or crank.

The reel handle speed determines the actual line tension and brake action or resistance. The fishing reel with the improved gear mechanism is so designed that the reel handle speed will not ever need or exceed 100 R. P. M.'s.

By reason of the new and novel gearing mechanism in this improved fishing reel it cannot be stalled, because at no time in the reel's operational use are the gears ever loaded to their maximum capacity. The sole purpose of the gear train is to generate high rotational speed for the fluid drive impellers, yet it is possible to obtain a 100% or solid clutch by the increase of reel handle R. P. M. With decrease of the reel handle speed, the effects of a flexible clutch is immediately obtained, further reduction in reel handle speed can actually allow the fluid drive clutch to slip, and thus effect an important safety factor to prevent line breakage.

Because of increased efficiency as the diameters become larger, this improved fishing reel is particularly adapted for use in the reels having a capacity of 750 yards of line, with the purpose of sport fishing for fish weighing 600 lbs. and up.

It will, of course, be understood that the spool is filled with suitable hydraulic fluid and the gear case is supplied with a suitable lubricant.

From the foregoing description taken in connection with the accompanying drawings it is thought the construction, operation and advantages of the invention will be clear to those skilled in the art.

What I claim is:

1. In apparatus wherein is provided a cradle, a spool rotatably mounted in said cradle and means to rotate said spool; the improvement which comprises a spool assembly consisting of a hollow elongated hub, right and left open ended shells fixed to said hub adjacent its ends, the ends of the hub projecting into the respective shells, and internally threaded rings fixed in the respective shells adjacent their open ends.

2. A cradle having two side plates spaced apart; a spool, including a hub and two shells secured on the hub and spaced apart; an end closer for each shell; one of said end closers having a hub with a stub shaft journalled in one of said side plates; a shaft located in part in said spool hub and having one of its ends journalled in said end closer hub; a driving impeller on said one end of said shaft and a turbine on said spool hub adjacent said driving impeller; the other end closer having a hub with a shaft bearing; a shaft journalled in said last named shaft bearing, a spider having a hub mounted on said last named shaft, the hub of said spider having a bearing in which the other end of said shaft, that is located in part in the spool hub, is journalled; a second driving impeller on the last mentioned shaft and a turbine on the spool hub adjacent the last named driving impeller; a ring gear on the last named driving impeller; a ring gear on said spool; at least one shaft with two pinions carried by said spider with one pinion meshing with one of said ring gears and the other pinion meshing with the other ring gear; and means to turn the shaft that carries the spider.

3. A cradle having two side plates spaced apart; a spool, including a hub and two shells secured on the hub and spaced apart; an end closer for each shell; one of said end closers having a hub with a stub shaft journalled in one of said side plates; a shaft located in part in said spool hub and having one of its ends journalled in said end closer hub; a driving impeller on said one end of said shaft and a turbine on said spool hub adjacent said driving impeller; the other end closer having a hub with a shaft bearing; a shaft journalled in said last named shaft bearing, a spider having a hub mounted on said last named shaft, the hub of said spider having a bearing in which the other end of said shaft, that is located in part in the spool hub, is journalled; a second driving impeller on the last mentioned shaft and a turbine on the spool hub adjacent the last named driving impeller; a ring gear on the last named driving impeller; a ring gear on said spool; at least one shaft with two pinions carried by said spider with one pinion meshing with one of said ring gears and the other pinion meshing with the other ring gear; and means to turn the shaft that carries the spider, said means comprising a drive shaft, a train of spur gears between said drive shaft and the shaft on which the spider is mounted, and a shiftable clutch for operatively connecting and disconnecting said train of gears from the spider-carrying shaft.

4. A cradle having two side plates spaced apart; a spool, including a hub and two shells secured on the hub and spaced apart; an end closer for each shell; one of said end closers having a hub with a stub shaft journalled in one of said side plates; a shaft located in part in said spool hub and having one of its ends journalled in said end closer hub; a driving impeller on said one end of said shaft and a turbine on said spool hub adjacent said driving impeller; the other end closer having a hub with a shaft bearing; a shaft journalled in said last named shaft bearing, a spider having a hub mounted on said last named shaft, the hub of said spider having a bearing in which the other end of said shaft, that is located in part in the spool hub, is journalled; a second driving impeller on the last mentioned shaft and a turbine on the spool hub adjacent the last named driving impeller; a ring gear on the last named driving impeller; a ring gear on said spool; at least one shaft with two pinions carried by said spider with one pinion meshing with one of said ring gears and the other pinion meshing with the other ring gear; and means to turn the shaft that carries the spider, the pairs of impellers being located in the respective shells and said gear train and clutch being located outside said shells.

5. A cradle having two side plates spaced apart; a spool, including a hub and two shells secured on the hub and spaced apart; an end closer for each shell; one of said end closers having a hub with a stub shaft journalled in one of said side plates; a shaft located in part in said spool hub and having one of its ends journalled in said end closer hub; a driving impeller on said one end of said shaft and a turbine on said spool hub adjacent said driving impeller; the other end closer having a hub with a shaft bearing; a shaft journalled in said last named shaft bearing, a spider having a hub mounted on said last named shaft, the hub of said spider having a bearing in which the other end of said shaft, that is located in part in the spool hub, is journalled; a second driving impeller on the last mentioned shaft and a turbine on the spool hub adjacent the last named driving impeller; a ring gear on the last named driving impeller; a ring gear on said spool; at least one shaft with two pinions carried by said spider with one pinion meshing with one of said ring gears and the other pinion meshing with the other ring gear; and means to turn the shaft that carries the spider, said means comprising a drive shaft, a train of spur gears between said drive shaft and the shaft on which the spider is mounted, and a shiftable clutch for operatively connecting and disconnecting said train of gears from the spider-carrying shaft, the pairs of impellers being located in the respective shells and said gear train and clutch being located outside said shells.

6. In apparatus of the class described, a cradle; a spool assembly rotatably mounted in said cradle, said assembly comprising a hollow elongated hub, right and left ended shells fixed to said hub adjacent its ends, the ends of the hub projecting into the respective shells and internally threaded rings fixed in the respective shells adjacent their open ends; a ring gear threaded into and supported by one of said internally threaded rings; a turbine on each projected end of said hub; a shaft journalled in said hub; an impeller mounted on each end of said shaft; a gear train within one of said shells operatively connecting said ring gear with the adjacent impeller; and means mounted on said cradle for applying power to said gear train to effect rotation of said spool.

7. In apparatus of the class described, a cradle; a spool assembly rotatably mounted in said cradle, said assembly comprising a hollow elongated hub, right and left ended shells fixed to said hub adjacent its ends, the ends of the hub projecting into the respective shells and internally threaded rings fixed in the respective shells adjacent their open ends; a ring gear threaded into and supported by one of said internally threaded rings; a turbine on each projected end of said hub; a shaft journalled in said hub; an impeller mounted on each end of said shaft; a gear train within one of said shells operatively connecting said ring gear with the adjacent impeller; means mounted on said cradle for applying power to said gear train to effect rotation of said spool; and closure plates held within the compass of said ring gear.

8. In apparatus of the class described, a cradle; a spool assembly rotatably mounted in said cradle, said assembly comprising a hollow elongated hub, right and left ended shells fixed to said hub adjacent its ends, the ends of the hub projecting into the respective shells and internally threaded rings fixed in the respective shells adjacent their open ends; a ring gear threaded into and supported by one of said internally threaded rings; a turbine on each projected end of said hub; a shaft journalled in said hub; an impeller mounted on each end of said shaft; a gear train within one of said shells operatively connecting said ring gear with the adjacent impeller, said gear train including a yoke having a hub and carrying a shaft with two gears one of which meshes with said ring gear and the other of which is operatively connected with said adjacent impeller; and means for turning said yoke about the axis of said spool.

9. In apparatus of the class described, a cradle; a spool assembly rotatably mounted in said cradle, said assembly comprising a hollow elongated hub, right and left ended shells fixed to said hub adjacent its ends, the ends of the hub projecting into the respective shells and internally threaded rings fixed in the respective shells adjacent their open ends; a ring gear threaded into and supported by one of said internally threaded rings; a turbine on each projected end of said hub; a shaft journalled in said hub; an impeller mounted on each end of said shaft; a gear train within one of said shells operatively connecting said ring gear with the adjacent impeller, said gear train including a yoke having a hub and carrying a shaft with two gears one of which meshes with said ring gear and the other of which is operatively connected with said adjacent impeller; and means for turning said yoke about the axis of said spool, said last named means including a crank shaft mounted on said cradle, another shaft secured to said yoke, and a gear train between said crank shaft and said another shaft.

JAMES T. KING.

References Cited in the file of this patent

UNITED STATES PATENTS

| Number | Name | Date |
| --- | --- | --- |
| 354,906 | Hunt | Dec. 28, 1886 |
| 1,141,189 | Kauffman | June 1, 1915 |
| 1,321,284 | Carter | Nov. 11, 1919 |
| 2,153,666 | Hill | Apr. 11, 1939 |
| 2,361,104 | Jandasek | Oct. 24, 1944 |
| 2,383,981 | Lysholm | Sept. 4, 1945 |